United States Patent
Lee et al.

(10) Patent No.: US 12,038,632 B2
(45) Date of Patent: Jul. 16, 2024

(54) DISPLAY DEVICE WITH CONTROLLABLE VIEWING ANGLE

(71) Applicant: LG Display Co., Ltd., Seoul (KR)

(72) Inventors: Semin Lee, Paju-si (KR); Jaejung Han, Paju-si (KR); Daeyong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,253

(22) Filed: Oct. 31, 2022

(65) Prior Publication Data

US 2023/0213796 A1 Jul. 6, 2023

(30) Foreign Application Priority Data

Dec. 30, 2021 (KR) .................... 10-2021-0192363

(51) Int. Cl.
*G09G 3/38* (2006.01)
*G02F 1/13* (2006.01)
*G02F 1/157* (2006.01)
*G02F 1/163* (2006.01)

(52) U.S. Cl.
CPC ............ *G02F 1/1323* (2013.01); *G02F 1/157* (2013.01); *G02F 1/163* (2013.01); *G09G 3/38* (2013.01); *G09G 2320/0233* (2013.01); *G09G 2320/028* (2013.01)

(58) Field of Classification Search
CPC ........ G02F 1/1323; G02F 1/157; G02F 1/163; G09G 3/38; G09G 2320/0233; G09G 2320/028; G09G 3/19; G09G 2300/023; G09G 2320/068; G09G 3/20
See application file for complete search history.

(56) References Cited

U.S. PATENT DOCUMENTS

| | | | | |
|---|---|---|---|---|
| 10,712,628 | B2 * | 7/2020 | Wu ........................ | G02F 1/153 |
| 2005/0174529 | A1 * | 8/2005 | Fukushima ........... | G02F 1/1323 349/197 |
| 2007/0171193 | A1 * | 7/2007 | Nakamura ............ | G02F 1/1323 345/156 |
| 2009/0058845 | A1 * | 3/2009 | Fukuda ................. | G02F 1/1323 345/214 |
| 2016/0379394 | A1 * | 12/2016 | Kim ....................... | G02B 30/27 345/629 |
| 2017/0061903 | A1 * | 3/2017 | Yata ..................... | G09G 3/3607 |
| 2017/0139243 | A1 * | 5/2017 | Ma ........................... | G09G 3/36 |

(Continued)

FOREIGN PATENT DOCUMENTS

| | | |
|---|---|---|
| KR | 10-2021-0020187 A | 2/2021 |
| KR | 10-2021-0066555 A | 6/2021 |

*Primary Examiner* — Ibrahim A Khan
(74) *Attorney, Agent, or Firm* — Birch, Stewart, Kolasch & Birch, LLP

(57) ABSTRACT

A display device according to an embodiment can include a display panel including a plurality of pixels in a matrix form and having a first pixel and a second pixel adjacent to each other among the plurality of pixels to form a group pixel, a barrier layer disposed on the display panel and including an opening portion disposed in some area of the group pixel for transmitting light and an electrochromic element positioned in a remaining area of the group pixel, and a driver configured to selectively drive a wide viewing angle mode and a narrow viewing angle mode by controlling a signal applied to the display panel and the barrier layer.

12 Claims, 16 Drawing Sheets

(56) References Cited

U.S. PATENT DOCUMENTS

| | | | |
|---|---|---|---|
| 2017/0310940 A1* | 10/2017 | Perdices-Gonzalez | ....................... G09G 3/002 |
| 2018/0284496 A1* | 10/2018 | Chen | ................... G02F 1/13476 |
| 2018/0364504 A1* | 12/2018 | Bae | ........................ G02F 1/137 |
| 2019/0016198 A1* | 1/2019 | Kim | .................. B32B 17/10027 |
| 2019/0353944 A1* | 11/2019 | Acreman | ................ G02F 1/137 |
| 2019/0385548 A1* | 12/2019 | Chen | ................. G02F 1/133611 |
| 2020/0174297 A1* | 6/2020 | Lim | ...................... G02F 1/1347 |
| 2020/0218101 A1* | 7/2020 | Ihas | ..................... G02B 6/0053 |
| 2022/0252951 A1* | 8/2022 | Kabe | ..................... G02F 1/155 |
| 2022/0310734 A1* | 9/2022 | Park | .................... G09G 3/3233 |
| 2023/0052905 A1* | 2/2023 | Koito | ................. G02F 1/13471 |

\* cited by examiner

DISPLAY DEVICE WITH CONTROLLABLE VIEWING ANGLE

CROSS-REFERENCE TO RELATED APPLICATION

The present application claims priority to Korean Patent Application No. 10-2021-0192363, filed on Dec. 30, 2021 in the Republic of Korea, the entire contents of which are hereby expressly incorporated by reference into the present application.

BACKGROUND OF THE DISCLOSURE

Field

The present disclosure relates to a display device capable of controlling a viewing angle.

Discussion of the Related Art

A demand on display devices for displaying an image is increasing across various types of devices, as the information society advances further. Against such backdrop, various display devices such as a liquid crystal display device (LCD), a light emitting display device, an organic light emitting display device, a micro light emitting device, a quantum dot display device and the like are being used recently.

In general, such a display device is developed to have a wide viewing angle so that a user can view an image in various angular directions. However, if the viewing angle of the display device is wide, there can be a case where a wide viewing angle can adversely affect the characteristics of the product. Therefore, the display device providing a narrow viewing angle is needed.

For example, in case of an automated teller machine (ATM) of a bank, it is more preferable that the viewing angle of the display device is narrow because it is needed to prevent others around the ATM from recognizing the personal information when the user inputs personal information. In addition, in case of a vehicle navigation system, when the viewing angle of the display device is wide, light is reflected on a windshield of the vehicle during night driving, which can adversely affect the driver's safe driving. In addition, in case of a computer or a mobile phone, having a wide viewing angle can run counter to a demand of a user since a user may not want private information to be disclosed.

Therefore, a display device capable of controlling a viewing angle adapted to situations is needed.

SUMMARY OF THE DISCLOSURE

The present disclosure relates to a display device capable of controlling a viewing angle, and aims to prevent deterioration in resolution and/or luminance of a display device.

One embodiment of the present disclosure is to provide a display device including: a display panel having a plurality of pixels in a matrix form and having a first pixel and a second pixel adjacent to each other among the plurality of pixels forming one group pixel; a barrier layer disposed on the display panel, and formed to have an opening portion disposed in some area of the group pixel and transmitting light and an electrochromic element positioned in a remaining area of the group pixel; and a driver for selectively driving a wide viewing angle mode and a narrow viewing angle mode by controlling a signal applied to the display panel and the barrier layer.

In the wide viewing angle mode, the driver applies an image signal constituting one frame to every pixel of the plurality of pixels forming the display panel, and the driver applies a control signal, to the barrier layer, for a transmitting mode that operates to make the electrochromic element transmit light.

In the narrow viewing angle mode, the driver applies an image signal constituting one frame to the first pixel among the plurality of pixels, applies a black signal to the second pixel among the plurality of pixels, and applies a control signal, to the barrier layer, for a shielding mode that operates to make the electrochromic element shield light.

In the barrier layer, the opening portion is disposed above the first pixel.

Another embodiment of the present disclosure provides a display device including: a display panel having a plurality of pixels in a matrix form; a first barrier layer disposed on the display panel and formed to have a first opening portion disposed in one area of the plurality of pixels and transmitting light and an electrochromic element positioned in a remaining area of the plurality of pixels; and a driver for selectively driving a wide viewing angle mode and a narrow viewing angle mode by controlling a signal applied to the display panel and the first barrier layer.

In the wide viewing angle mode, the driver applies a control signal, to the first barrier layer, for a transmitting mode that operates to make the electrochromic element transmit light, and in the narrow viewing angle mode, the driver applies a control signal, to the first barrier layer, for a shielding mode that operates to make the electrochromic element shield light.

The display device further includes a second barrier layer disposed on the first barrier layer, and the second barrier layer includes: a second opening portion disposed at a position corresponding to the first opening portion and a shielding portion disposed at a position corresponding to the electrochromic element and shielding light.

The display device further includes a second barrier layer disposed between the first barrier layer and the display panel, and the second barrier layer includes a second opening portion disposed at a position corresponding to the first opening portion and a shielding portion disposed at a position corresponding to the electrochromic element and shielding light.

The electrochromic element includes two transparent electrodes provided opposite to each other, an electrochromic layer and an ion storage layer.

The electrochromic layer can include a material of which optical properties are changed through oxidation or reduction reaction.

The display device according to an embodiment of the present disclosure can control a viewing angle, and at the same time, can prevent deterioration in the resolution and luminance of the display device in a wide viewing angle mode.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
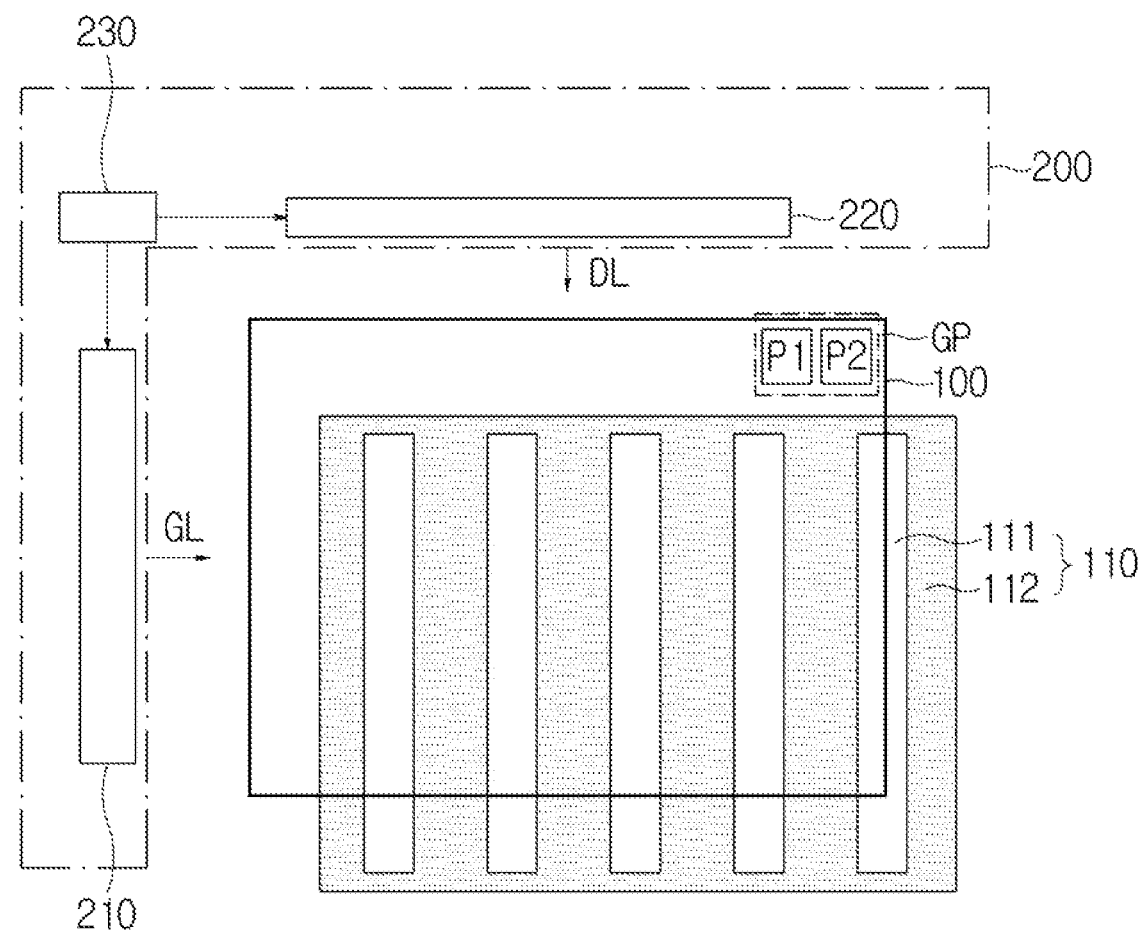
FIG. 1 is a schematic configuration view of a display device according to a first embodiment and a second embodiment of the present disclosure.

Shapes, sizes, proportions, angles, numbers and the like disclosed in the accompanying drawings are taken merely as examples to explain embodiments and the present disclosure is not limited thereto. Like reference numerals denote like elements throughout the specification. In addition, in describing the present disclosure, if a description of a related known art in detail is deemed to unnecessarily obscure the substance of the present disclosure, description of such art will be omitted. When terms, 'comprise', 'have' and 'be achieved' and the like, are used in the present disclosure, other object not mentioned therein can be added unless the terms are used with the term 'only'. The singular forms expressed herein are intended to include the plural forms as well, unless the context expressly indicates otherwise.

Components are interpreted to include an error range unless otherwise expressly stated.

In case of describing positions, for example, when describing position relation between two parts with terms such as 'in', 'upon', 'below', 'next' and the like, one or more intervening parts can be disposed between the two parts, unless the terms are used with terms 'immediately' or 'directly'.

Though terms such as 'a first', or 'a second' and the like are used to describe various components, these components are not confined by these terms. These terms are merely used to distinguish one component from the other component, and my not define any order or sequence. Therefore, a first component being mentioned in the description below can be a second component in a technical concept of the present disclosure.

Like reference numerals denote like elements throughout the specification.

Hereinafter, various embodiments of the present disclosure will be described in detail with reference to accompanying drawings. The titles of the components used hereinbelow are chosen for convenience of description, and they can differ from what they are actually named. Further, all the components of each display device according to all embodiments of the present disclosure are operatively coupled and configured.

FIG. 1 is a schematic configuration view of a display device according to first embodiment and the second embodiments of the present disclosure.

Referring to FIG. 1, the display device includes a display panel 100 to display an image and a driver 200 to drive the display panel 100.

The display panel 100 is formed of a plurality of pixels P of which areas are divided by a gate line GL and a data line DL that cross each other.

The plurality of pixels P constituting the display panel 100 are arranged in a matrix form constituting rows and columns, each of the pixels P includes a red, green and blue color pixel R, G, B to display a color, and a group pixel GP is formed of a plurality of pixels such as P1 and P2 adjacent to each other in a vertical or a horizontal direction gathered together.

The display panel 100 displays an image in each pixel P according to an image signal supplied through the data line DL and a scan signal supplied sequentially to the gate line GL.

A barrier layer 110 is disposed on the display panel 100.

The barrier layer 110 according to an embodiment of FIGS. 2 to 3 (hereinafter, first embodiment) is a passive barrier layer, and includes an opening portion 111 and a shielding portion 112. The opening portion 111 of the passive barrier layer 110 is disposed in one area of the group pixel GP and transmits light, and the shielding portion 112 is disposed in the remaining area of the group pixel GP and shields light.

The barrier layer 110 according to an embodiment of FIGS. 4 to 6 (hereinafter, second embodiment) is a passive barrier layer and includes an opening portion 111 and an electrochromic element 113. With regard to the electrochromic element 113, optical properties thereof such as color or light transmittance of an electrochromic active material are changed by an electrochemical redox reaction of materials. The light transmittance of the electrochromic element 113 can be adjusted according to an electrical signal applied thereto.

With reference to FIG. 1, the driver 200 controls a signal applied to each pixel P of a group pixel GP constituting the display panel 100, thereby selectively drives a wide viewing angle mode and a narrow viewing angle mode.

In various embodiments of the present disclosure, the driver 200 controls a signal applied to the barrier layer 110, thereby selectively drives the wide viewing angle mode and the narrow viewing angle mode.

The driver 200 includes a gate driver 210, a data driver 220, a timing controller 230 and the like to drive the gate line GL and the data line DL of the display panel 100, respectively.

The gate driver 210 sequentially supplies the scan signal to the gate line GL according to a gate control signal supplied by the timing controller 230.

The data driver 220 converts pixel data (grey level), which is input through a signal converter 250 by the timing controller 230, and supplies the converted pixel data to the data line DL, in response to the data control signal supplied by the timing controller 230.

The timing controller 230 outputs a red, green and blue pixel data which is input from the outside, and generates the gate control signal and the data control signal which control an operation timing of the gate driver 210 and the data driver 220 respectively, by using a vertical synchronization signal Vsync and a horizontal synchronization signal Hsync, a clock signal CLK and the like.

Figure 2:
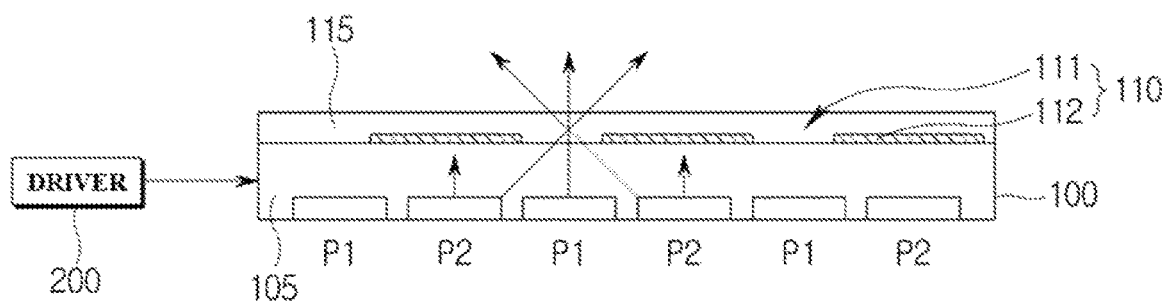
FIG. 2 is a diagram illustrating a case where the display device according to the first embodiment of the present disclosure is driven in a wide viewing angle mode.
Figure 3:
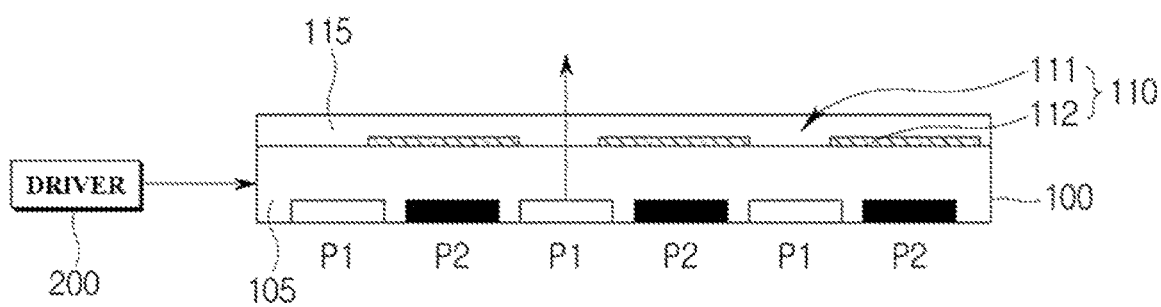
FIG. 3 is a diagram illustrating a case where the display device according to the first embodiment of the present disclosure is driven in a narrow viewing angle mode.

FIGS. 2 and 3 are diagrams illustrating the display device formed of a passive barrier layer according to the first embodiment of the present disclosure.

Particularly, FIG. 2 is a diagram illustrating a case where the display device is driven in the wide viewing angle mode, and FIG. 3 is a diagram illustrating a case where the display device is driven in the narrow viewing angle mode.

By controlling a signal processing of each group pixel GP after arranging the barrier layer 110 in the same way as the cross-section illustrated in FIGS. 2 and 3 while having a cycle of a group pixel formed of two pixels P1, P2, it is possible to control breadth and narrowness of a viewing angle.

The display device according to the first embodiment enables pixels P corresponding to the opening portion 111 and the shielding portion 112 of the barrier layer 110 to be turned on or off, depending on respective modes, or supplies another signal.

On the display panel 100, the passive barrier layer 110 is disposed with a uniform distance and in the display panel 100, a first pixel P1 and a second pixel P2 arranged side by side in a horizontal direction form one group pixel GP. On the display panel 100, a first planarization layer 105 can be disposed so as to planarize an uneven surface made by various structures that form the pixel.

The opening portion 111 of the passive barrier layer 110 is formed in the upper region of the first pixel P1. The shielding portion 112 is formed in the upper region of the second pixel P2, and the shielding portion 112 is formed to cover the whole surface of the second pixel. The passive barrier layer 110 can include a second planarization layer 115 that planarizes unevenness of the shielding portion 112.

In the front upper part of the second pixel P, the shielding portion 112 of the passive barrier layer 110 is configured. In this structure, the signal applied to the second pixel P2 is controlled as an image signal or a black signal, and a wide viewing angle mode having both a valid front viewing angle and a side viewing angle and a narrow viewing angle mode blocking the side viewing angle is selectively switched.

Hereinbelow, making light emitted from the display panel 100 to be emitted within the cut off angle range only is defined as the narrow viewing angle mode, and making light emitted from the display panel 100 to be emitted above the predetermined angle range is defined as the wide viewing angle mode.

The modes are described in more detail below.

Referring to FIG. 2, in the wide viewing angle mode, an image signal corresponding to a frame is applied to each of the plurality of pixels P1, P2 forming the display panel 100, and consequently, the same frame is displayed in both the front and the side direction.

Referring to FIG. 3, in the narrow viewing angle mode, an image signal to display a frame is applied only to the first pixel P1 among the plurality of pixels P1, P2 forming the display panel 100, and a black signal is applied to the second pixel P2. Accordingly, a normal frame is displayed in the front direction, and a black frame that distorts a normal frame is displayed in the side direction.

As above, the display device according to the first embodiment disposes the barrier layer 110 formed to have the opening portion and the shielding portion on the display panel thereof, and allows to selectively drive the wide viewing angle mode and the narrow viewing angle mode, as the driver 200 controls the signal applied to each pixel P of the group pixel forming the display panel 100.

However, the barrier layer 110 according to the first embodiment is a passive type and the shielding portion 112 is disposed on the second pixel P2 and shields light emitted by the second pixel P2 in the wide viewing angle mode, too. Therefore, there may be a shortcoming in that display is made possible at a half luminance out of the full luminance available to be provided by the display panel 100 in the wide viewing angle mode as well as in the narrow viewing angle mode.

Figure 4:
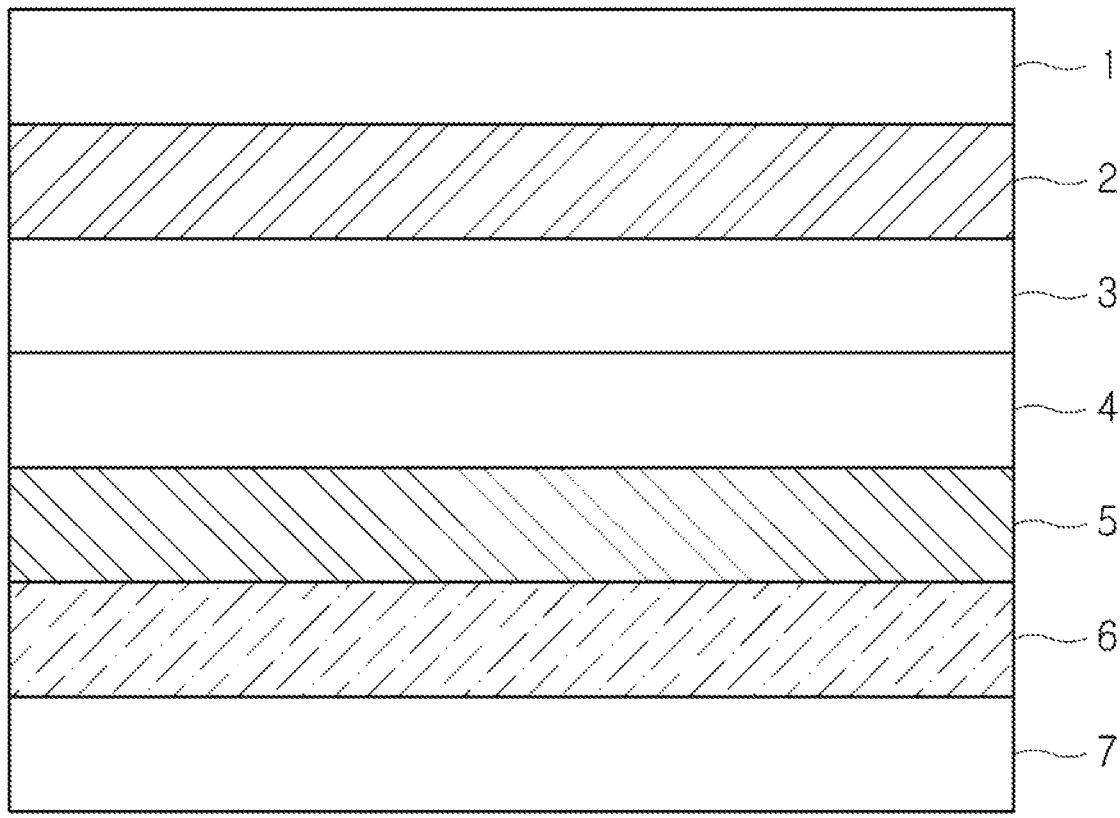
FIG. 4 is a cross-sectional view of an electrochromic element constituting a barrier layer according to the second embodiment of the present disclosure.
Figure 5:
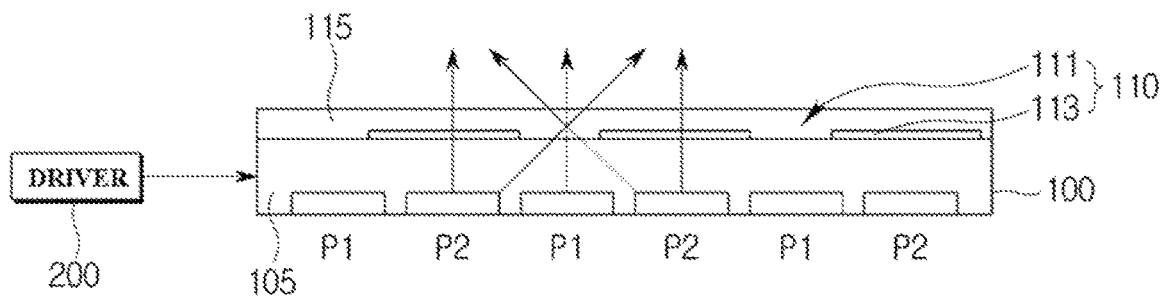
FIG. 5 is a diagram illustrating a case where the display device according to the second embodiment of the present disclosure is driven in a wide viewing angle mode.
Figure 6:
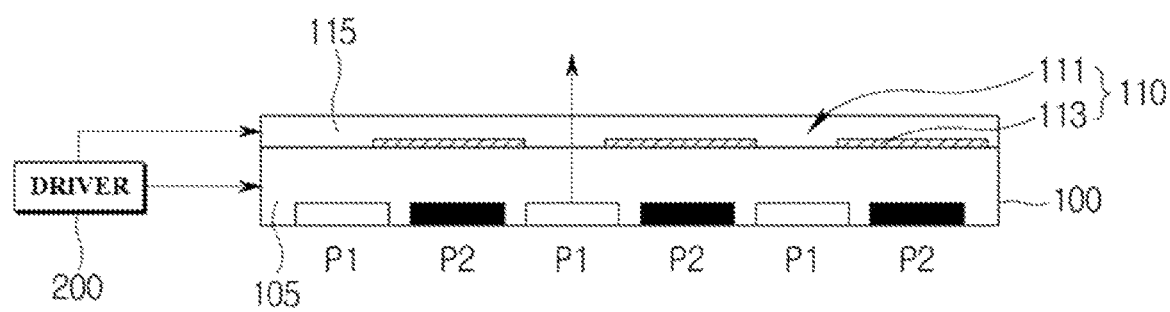
FIG. 6 is a diagram illustrating a case where the display device according to the second embodiment of the present disclosure is driven in a narrow viewing angle mode.

FIGS. 4 to 6 are diagrams to explain a display device configured of an active barrier layer according to the second embodiment of the present disclosure.

FIG. 4 is a cross-sectional view of an electrochromic element constituting a barrier layer according to the second embodiment of the present disclosure. FIG. 5 is a diagram illustrating a case where the display device according to the second embodiment of the present disclosure is driven in the wide viewing angle mode, and FIG. 6 is a diagram illustrating a case where the display device according to the second embodiment of the present disclosure is driven in the narrow viewing angle mode.

The active barrier layer 110 according to the second embodiment can include the second planarization layer 115 that planarizes an uneven surface of the shielding portion 112. Compared to the passive barrier layer 110 of the first embodiment, the active barrier layer 110 has difference in that the shielding portion 112 of the first embodiment is replaced with the electrochromic element 113. In FIG. 5 which explains the wide viewing angle mode, the electrochromic element 113 is illustrated to be transparent.

Referring to FIG. 4, the electrochromic element 113 according to the second embodiment includes a base layer 7, a first transparent electrode 6 disposed on the base layer 7, an electrochromic layer 5 disposed on the first transparent electrode 6, an ion conductive layer 4 disposed on the electrochromic layer 5, an ion storage layer 3 disposed on the ion conductive layer 4, a second transparent electrode 2 disposed on the ion storage layer 3 and an encapsulation layer 1 disposed on the second transparent electrode 2.

The base layer 7 is to planarize the top surface of the display panel. The base layer 7 can be formed of an organic material. For example, the base layer 7 can be configured of a single layer or a double layer made of polyimide or a photo-acryl, but is not limited thereto.

The first transparent electrode 6 and the second transparent electrode 2 supply an electric charge to the electrochromic layer. The first transparent electrode 6 and the second transparent electrode 2 can be formed by including one among a transparent conductive oxide (TCO), a conductive polymer, a silver (Ag) nanowire, or a metal mesh. More specifically, indium tin oxide (ITO), fluorine doped tin oxide (FTO), aluminum doped zinc oxide (AZO), gallium doped zinc oxide (GZO), antimony doped tin oxide (ATO), indium doped zinc oxide (IZO), niobium doped titanium oxide (NTO), ZnO, Oxide/Metal/Oxide (OMO) or CTO and the like can be used as an electrode material, but is not limited thereto. In another embodiment, the first transparent electrode 6 and the second transparent electrode 2 can have a structure where two or more electrode materials are stacked to form multiple layers.

The electrochromic layer 5 can be defined as a material that can change optical properties. The electrochromic layer 5 can include an inorganic material such as tungsten oxide or lithium nickel oxide as an electrochromic material. Specifically, when certain potential is applied to an electrode, an electrolyte ion such as H+, or Li+ and Na+ moves between the electrochromic layer and the ion storage layer 3, and at the same time, an electron is injected to the electrochromic layer 5 through an external circuit, or gets out from the electrochromic layer 5, and oxidation or reduction reaction of the electrochromic material takes turns, and then, the electrochromic layer 5 or the ion storage layer 3 is colored or bleached.

The ion conductive layer 4 is a layer providing a mobility environment for an ion for the purpose of coloring or bleaching of the electrochromic layer 5. When a voltage is supplied to both sides of the electrochromic layer 5, the ion conductive layer 4 conducts an ion between the electrochromic layer 5 and the ion storage layer 3. The ion conductive layer 4 can be formed of a material including a moving ion. The ion conductive layer 4 can be formed of a solid electrolyte layer. The ion conductive layer can be configured by including tantalum (Ta).

The ion storage layer 3 is formed to strike a balance of an electric charge with the electrochromic layer 3 during when a reversible oxidization and reduction reaction is performed for bleaching of the electrochromic layer 5. The ion storage layer 3 is formed to include a color changing material having color developing characteristics which differs from that of the electrochromic layer 5, in other words, a color changing material having complementary color developing characteristics. The ion storage layer 3 can be configured by including at least one among tantalum (Ta), nickel (Ni) and iridium (Ir).

The encapsulation layer 1 is disposed on the second transparent electrode 2. The encapsulation layer 1 minimizes deterioration of components of the electrochromic element 113 caused by water or oxygen and the like. The encapsulation layer planarizes a top surface of the electrochromic element 113. The encapsulation layer 1 can be formed of an inorganic material layer or an organic material layer. Or, the encapsulation layer 1 can have a structure where an inorganic material layer or an organic material layer are stacked to form multiple layers.

The display device according to the second embodiment has difference in that the barrier layer 110 disposed on the display panel 100 is an active type, compared to the fact that the barrier layer 110 of the first embodiment is a passive type.

Specifically, the barrier layer 110 of the second embodiment is formed to have the opening portion 111 disposed in some area of the group pixel and transmitting light and the electrochromic element 113 positioned in the remaining area of the group pixel.

In the wide viewing angle mode, the driver 200 applies an image signal constituting one frame to every pixel P1, P2 of the plurality of pixels forming the display panel 100, and applies a control signal, to the barrier layer, for a transmitting mode that operates to make the electrochromic element transmit light.

Further, in the narrow viewing angle mode, the driver 200 applies an image signal constituting one frame to the first pixel P1 among the plurality of pixels, applies a black signal to the second pixel P2 among the plurality of pixels, and applies a control signal, to the barrier layer, for a shielding mode that operates to make the electrochromic element shield light.

In the second embodiment, the electrochromic element 113 is driven to transmit light in the wide viewing angle mode. Therefore, the second embodiment allows a degree of luminance reduction improving in the wide viewing angle mode, compared with the first embodiment.

However, the first embodiment and the second embodiment have shortcoming in that since both embodiments are driving two pixels P1, P2 as one group pixel, the resolution thereof is reduced to a half of the full resolution available to be implemented by the display panel 100.

Figure 7:
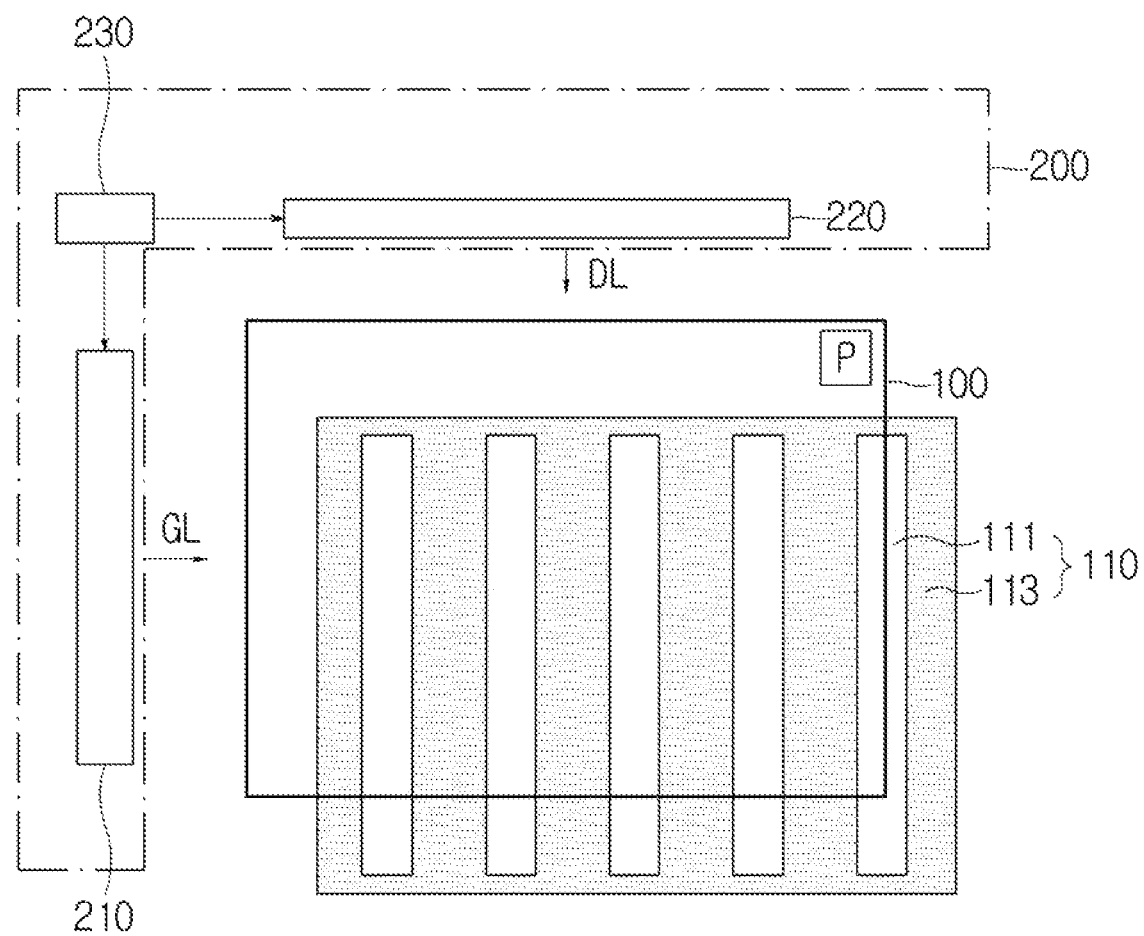
FIG. 7 is a schematic configuration view of a display device according to third, fourth and fifth embodiments of the present disclosure.

FIG. 7 is a schematic configuration view of a display device according to another embodiment of the present disclosure. Specifically, FIG. 7 is a schematic configuration view of a display device according to the third to the fifth embodiments of the present disclosure.

Compared with the embodiment of FIG. 1 where two pixels P1, P2 are driven as one group pixel, the embodiment of FIG. 7 has difference in that the embodiment drives a plurality of pixels disposed in the display panel 100 individually.

Therefore, the third to fifth embodiments according to the present disclosure can help solving a problem of resolution reduction of the first and second embodiments mentioned above.

The embodiment of FIGS. 8 to 10 (hereinafter, the third embodiment) drives a plurality of pixels disposed in the display panel individually.

Figure 8:
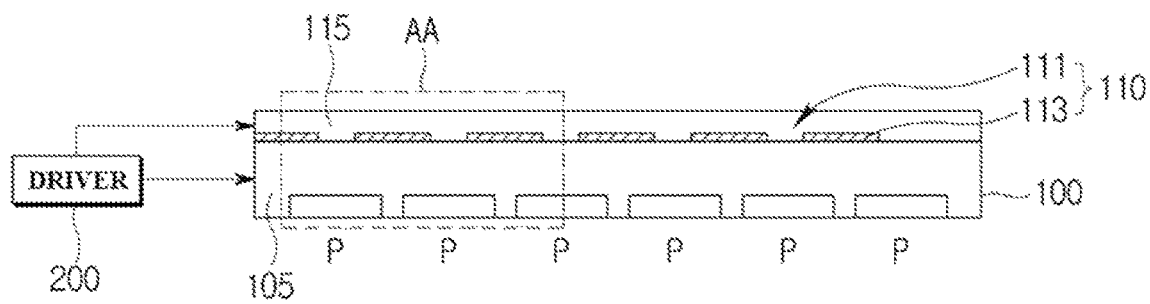
FIG. 8 is a cross-sectional view of a display device according to the third embodiment of the present disclosure.

FIG. 8 is a cross-sectional view of a display device according to the third embodiment of the present disclosure. FIG. 9 is an enlarged view of an 'AA' region of FIG. 8. FIG. 10 is a diagram illustrating a light path of an 'AA' region of FIG. 8. FIG. 11 is a diagram illustrating Snell's law in two layers each having a different refractive index.

The display device according to the third embodiment includes the display panel 100, the barrier layer disposed on the display panel 100, and the driver 200 that selectively drives the wide viewing angle mode and the narrow viewing angle mode by controlling a signal applied to the display panel 100 and the barrier layer.

In the display panel 100, a plurality of pixels P are arranged in a matrix form. The barrier layer is disposed on the display panel 100, and includes the opening portion 111 and the electrochromic element 113. The opening portion 111 positions in some area of the plurality of pixels P and transmits light.

The electrochromic element 113 positions in the remaining area of the plurality of pixels P. The electrochromic element 113 is identical to the configuration of the electrochromic element 113 illustrated in FIG. 4.

Figure 9:
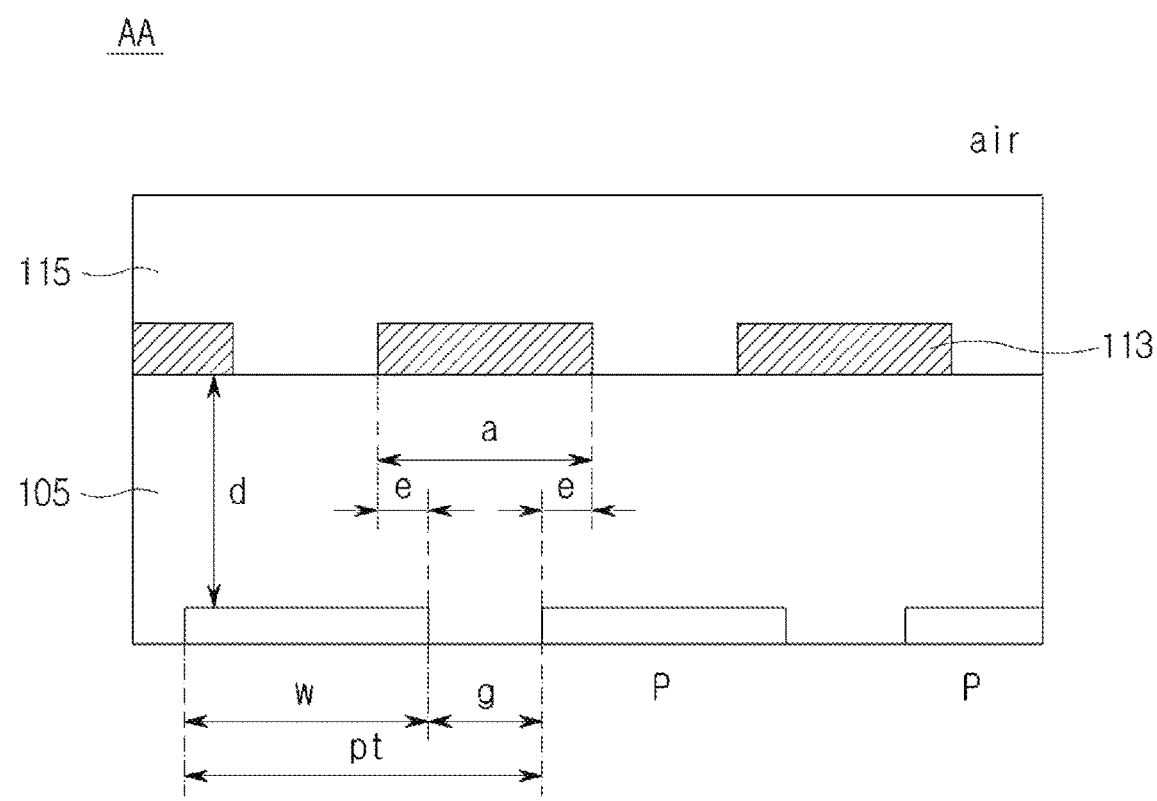
FIG. 9 is an enlarged view of an 'AA' region of FIG. 8.
Figure 10:
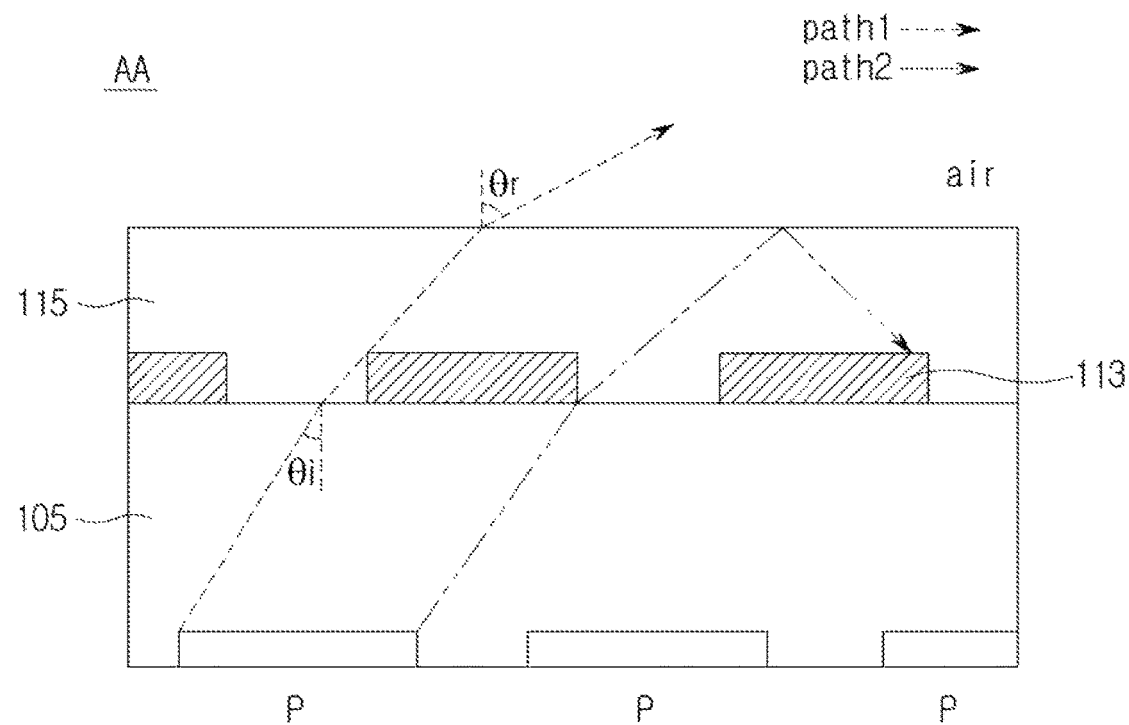
FIG. 10 is a diagram illustrating a light path of an 'AA' region of FIG. 8.
Figure 11:
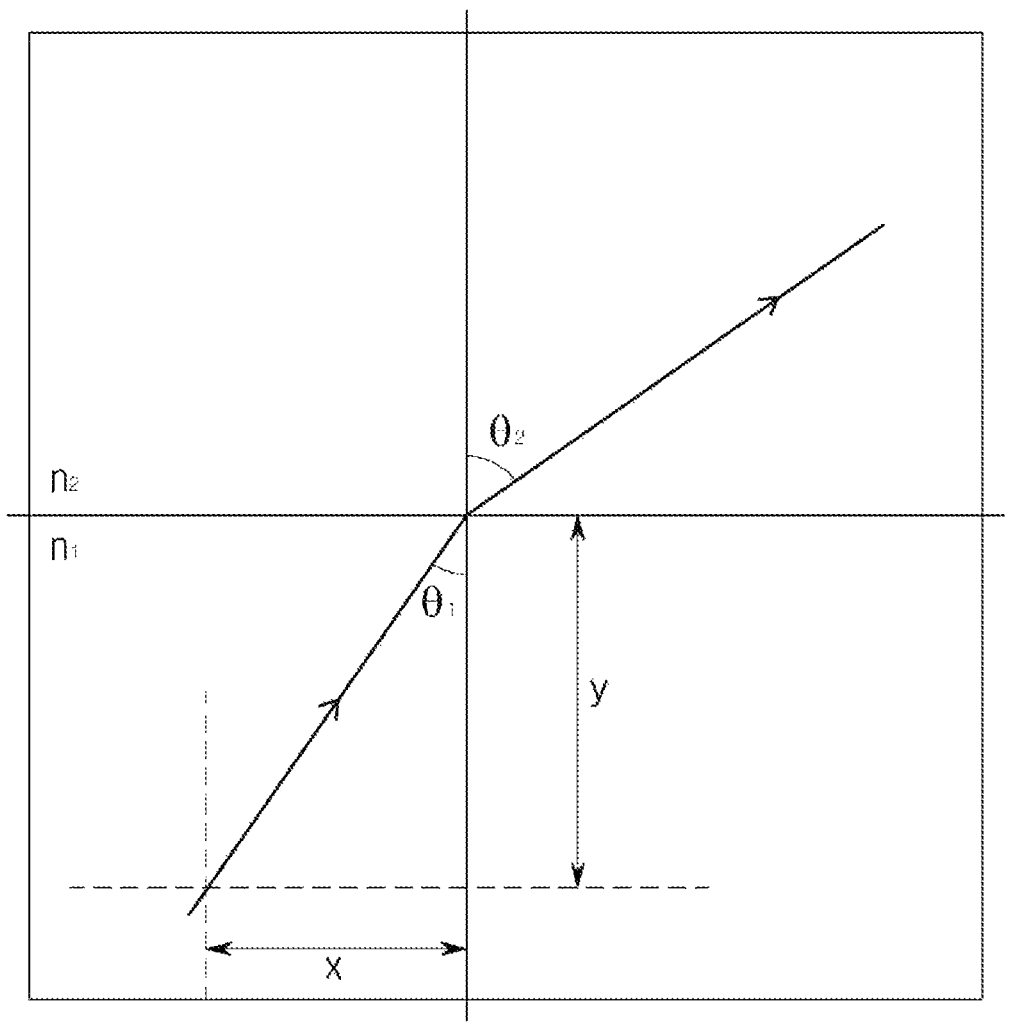
FIG. 11 is a diagram illustrating Snell's law in two layers each having a different refractive index.

Referring to FIGS. 9 to 11, a designing condition of the display panel 100 and the barrier layer 110 for the narrow viewing angle mode will be explained.

In FIG. 9, a is a width of the electrochromic element 113, d is a distance between the electrochromic element 113 and a pixel P, e is a width of an overlapping area where the electrochromic element 113 and a pixel P overlap, g is a gap between a pixel P and a pixel P, w is a width of one pixel P, and pt is an arrangement interval of a pixel P.

In FIG. 10, the light path 1 (path 1) indicates the light path emitted from the left edge of a pixel P. The light path 2 (path 2) indicates the light path emitted from the right edge of the above-mentioned pixel P.

FIG. 11 is a diagram to explain a light traveling path in two different medium each having a different refractive index. In FIG. 11, the light moves from a first medium having a first refractive index $n_1$ to a second medium having a second refractive index $n_2$, and $\theta_1$ is an incidence angle, while $\theta_2$ is a refraction angle. The traveling path of light as the light meets two medium having different refractive indices adheres to Snell's law. According to Snell's law, a relational expression between the refractive index and the incidence angle and the refraction angle is equal to the Equation 1.

$$n_1 \sin \theta_1 = n_2 \sin \theta_2 \qquad \text{[Equation 1]}$$

If the Equation 1 is arranged as a relational expression for x and y, it is equal to Equation 2.

$$\frac{y}{x} = \cot\theta_1 = \cot\left(\sin^{-1}\left(n_1 \sin\frac{\theta_2}{n_1}\right)\right) \qquad \text{[Equation 2]}$$

By substituting the Equation 2 into the light path 1 of FIG. 10, the following relational Equation 3 can be obtained.

$$\frac{d}{w-e} = \frac{y}{x} = \cot\left(\sin^{-1}\left(n_{air}\sin\frac{\theta_r}{n_1}\right)\right) \qquad \text{[Equation 3]}$$

In the narrow viewing angle mode, the light path 1 (path 1) emitted from the pixel should not be seen at an angle wider than the cut-off viewing angle (for example, 45 degrees), therefore, Equation 3 becomes to have the same condition as Equation 4.

$$\frac{d}{w-e} \geq \cot\left(\sin^{-1}\left(n_{air}\sin\frac{\theta_r}{n_1}\right)\right) \qquad \text{[Equation 4]}$$

Here, $n_1$ is a refractive index value of the first planarization layer 105 of the display panel 100, and $n_{air}$ is a refractive index value of air and has a value of 1.

By substituting the Equation 2 into the light path 2 (path 2) of FIG. 10, the following relational Equation 5 can be obtained.

$$\frac{d}{g+e} = \frac{y}{x} = \cot\left(\sin^{-1}\left(n_{air}\sin\frac{\theta_r}{n_1}\right)\right) \qquad \text{[Equation 5]}$$

In the narrow viewing angle mode, the light path 2 (path 2) should be totally reflected, therefore, Equation 3 becomes to have the same condition as Equation 6.

$$\frac{d}{g+e} \leq \cot\left(\sin^{-1}\left(n_{air}\sin\frac{\theta_r}{n_1}\right)\right) \qquad \text{[Equation 6]}$$

Here, $n_1$ is a refractive index value of the first planarization layer 105 of the display panel 100, and $n_{air}$ is a refractive index value of air, and has a value of 1.

As a result, the display device of the third embodiment should meet the designing condition of Equation 4 and Equation 6, in order to drive the narrow viewing angle mode.

In addition, in order to minimize luminance loss of the display device of the third embodiment, it is preferable to design the display device on a condition of maximizing an opening ratio (OPR).

$$OPR = \frac{w - 2e}{w + g}$$

Figure 12:
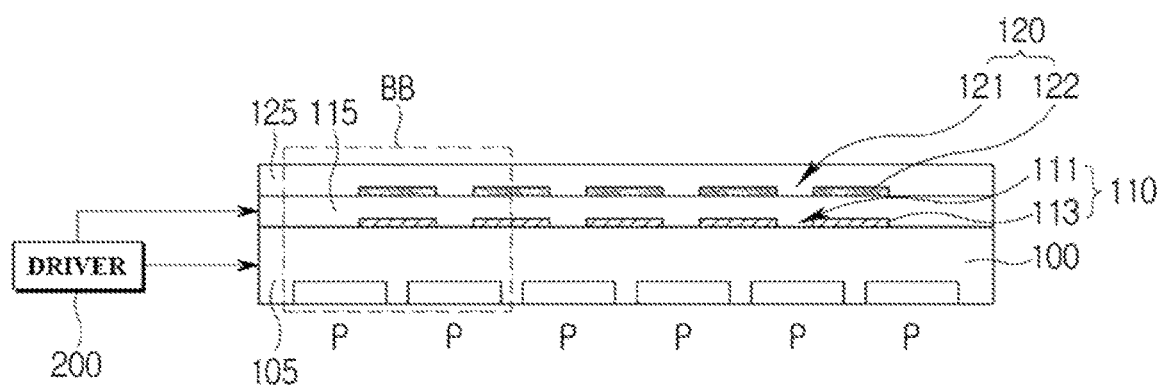
FIG. 12 is a cross-sectional view of a display device according to the fourth embodiment of the present disclosure.
Figure 13:
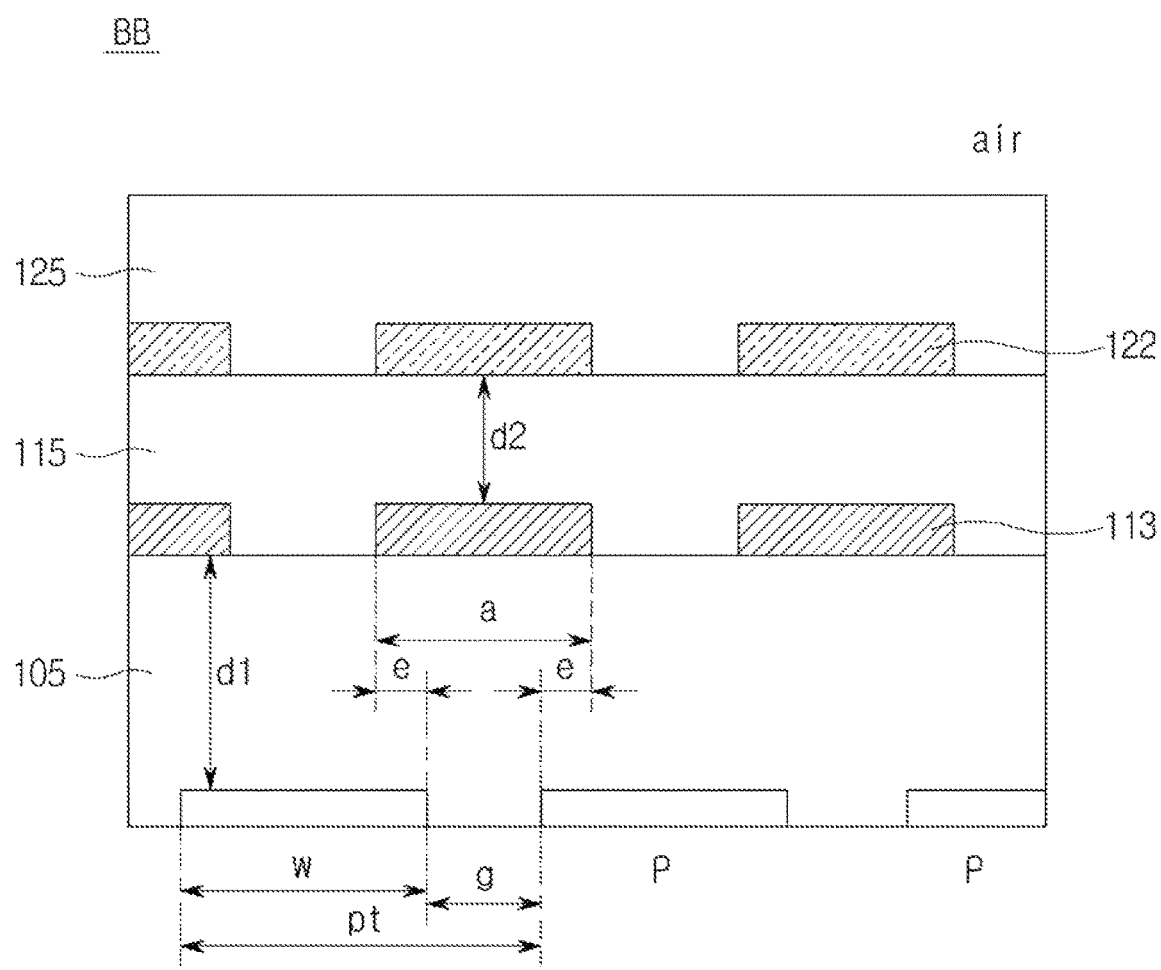
FIG. 13 is an enlarged view of a 'BB' region of FIG. 12.
Figure 14:
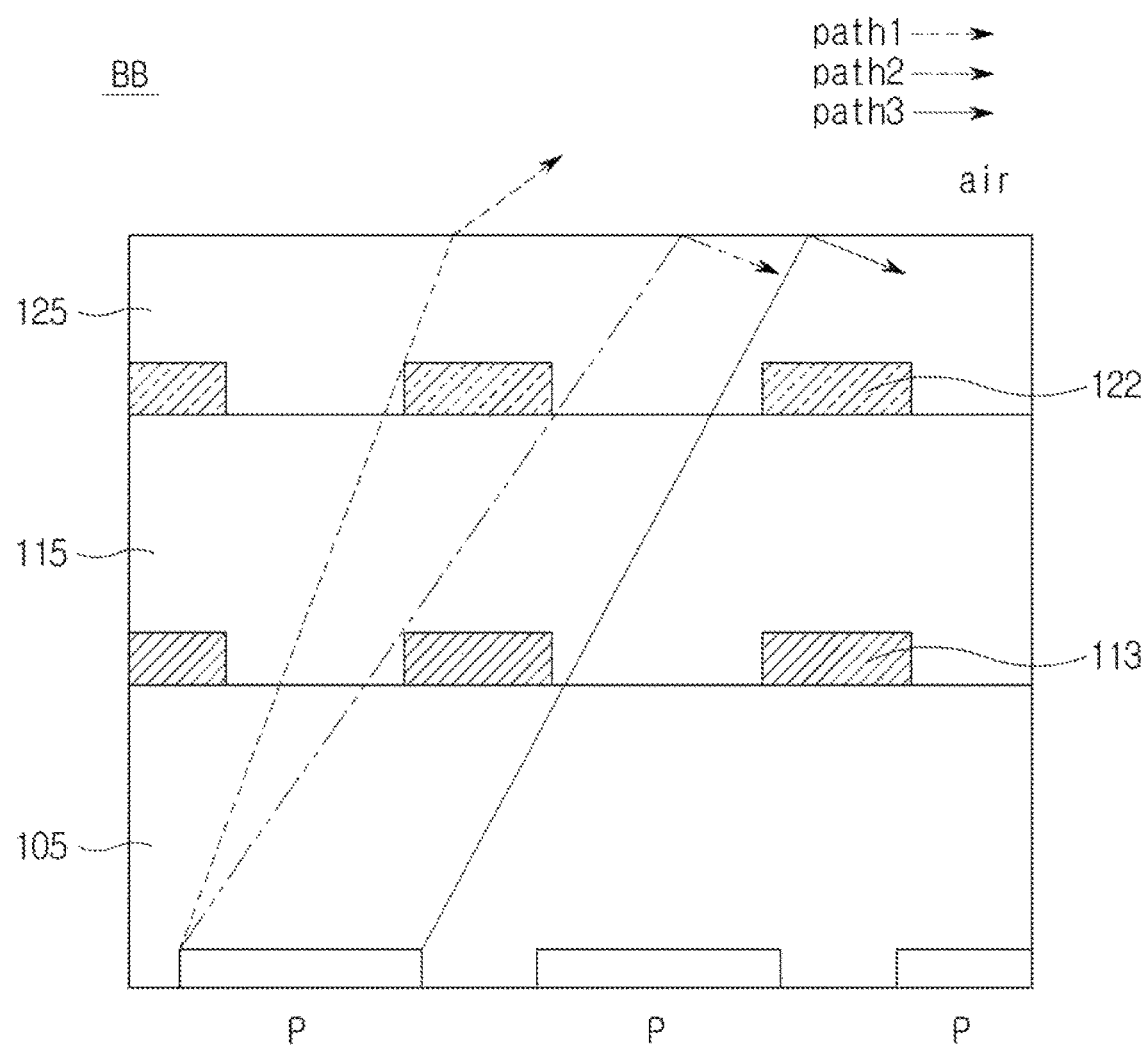
FIG. 14 is a diagram illustrating a light path of a 'BB' region of FIG. 12.
Figure 15:
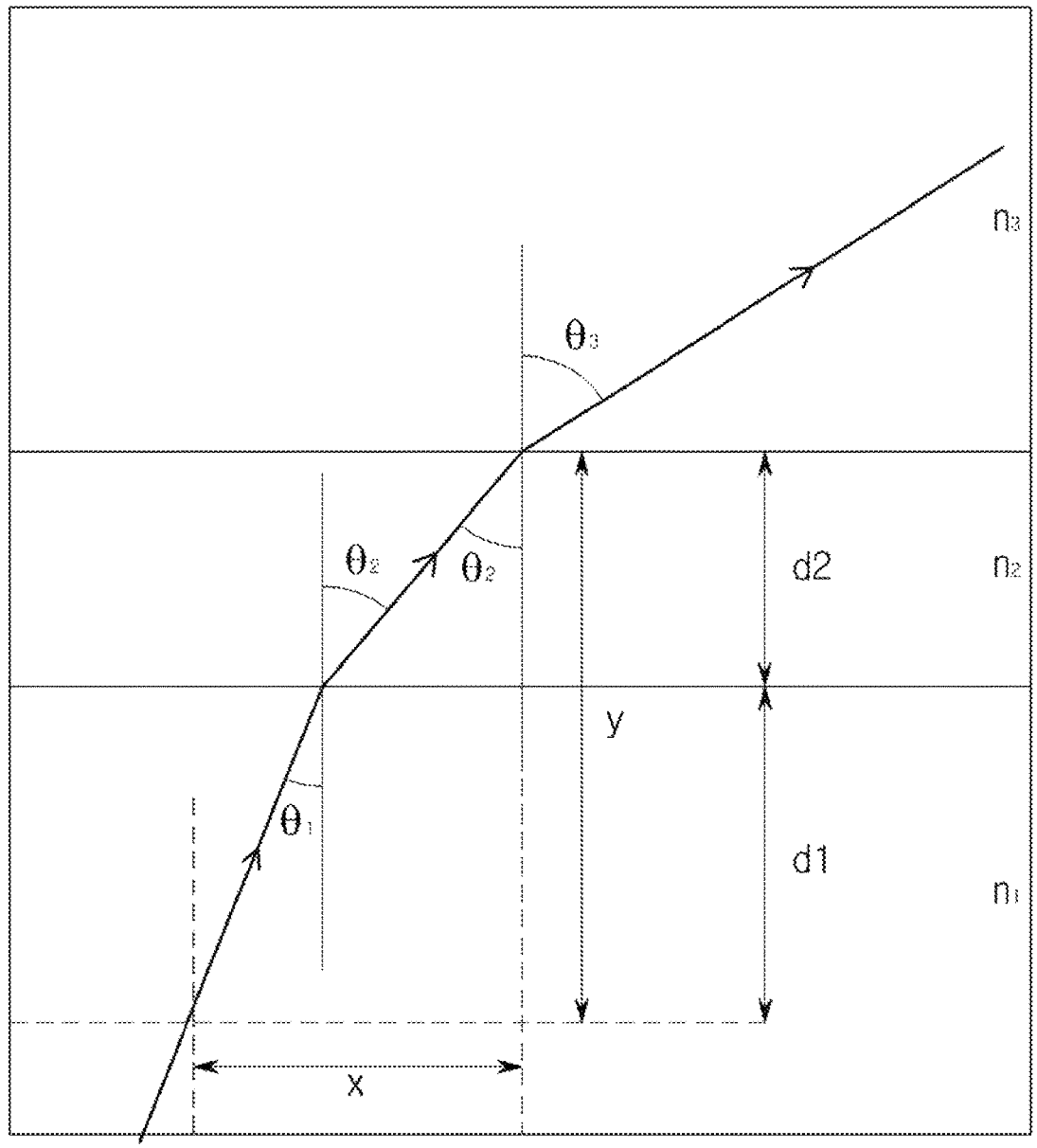
FIG. 15 is a diagram illustrating Snell's law in three layers.
Figure 16:
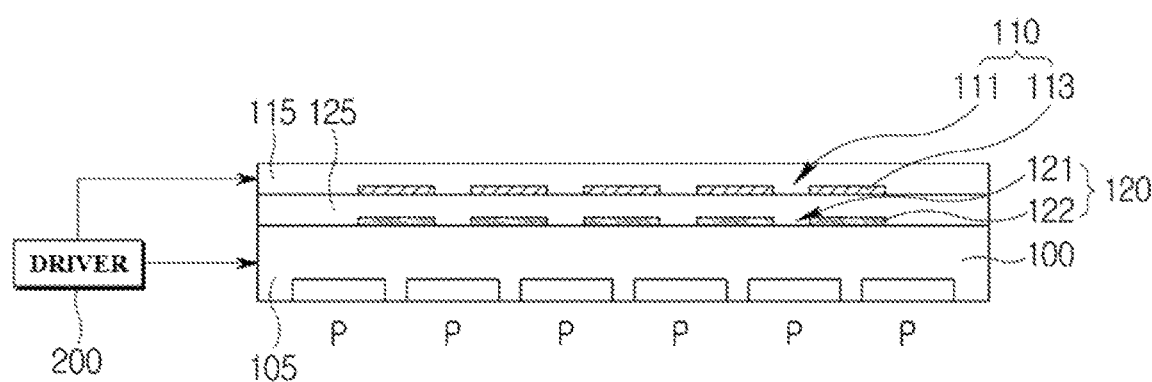
FIG. 16 is a cross-sectional view of a display device according to the fifth embodiment of the present disclosure.

FIG. 12 is a cross-sectional view of a display device according to the fourth embodiment of the present disclosure. FIG. 13 is an enlarged view of a 'BB' region of FIG. 12. FIG. 14 is a diagram illustrating a light path of a 'BB' region of FIG. 12. FIG. 15 is a diagram illustrating Snell's law in three layers. FIG. 16 is a cross-sectional view of a display device according to the fifth embodiment of the present disclosure.

In FIG. 13, a is a width of the electrochromic element 113, d1 is a distance between the electrochromic element 113 and a pixel P, d2 is a distance between the electrochromic element 113 and the shielding portion 112, e is a width of an overlapping area where the electrochromic element 113 and the pixel P overlap, g is a gap between a pixel P and a pixel P, w is a width of one pixel P, and pt is an arrangement interval of a pixel P.

In FIG. 14, for convenience of calculation, the light path is illustrated on an assumption that refractive indices of the first planarization layer 105 of the display panel 100, the second planarization layer 115 of the first barrier layer 110, and a third planarization layer 125 of the second barrier layer 120 are the same.

The display device according to the fourth to fifth embodiments is characterized in that the barrier layer is formed of two layers.

In the display device according to the fourth to fifth embodiments, the first barrier layer 110 can be formed of the active barrier layer of the second and the third embodiments. The second barrier layer 120 can be formed of the passive barrier layer of the first embodiment. The second barrier layer 120 includes an opening portion 121 and a shielding portion 122. The opening portion 121 of the second barrier layer 120 can be disposed at a position corresponding to the opening portion 111 of the first barrier layer 110. The shielding portion 122 of the second barrier layer 120 shields light, and can be disposed at a position corresponding to the electrochromic element 113 of the first barrier layer 110.

The relation of arrangement between the first barrier layer 110 and the second barrier layer 120 can vary. The embodiment of FIG. 12 shows that the first barrier layer 110 is disposed on the display panel 100, the second barrier layer 120 is disposed on the first barrier layer 110. On the other hand, the embodiment of FIG. 16 shows that the second barrier layer 120 is disposed on the display panel 100 and the first barrier layer 110 is disposed on the second barrier layer 120.

If the barrier layer 110 is formed as a single layer, the opening portion 111 of the barrier layer 110 should be narrow, in order for smooth operation of the narrow viewing angle mode. In other words, a part 'e' which is a width of an overlapping area of the electrochromic element 113 and a pixel P should be wide. Therefore, if the barrier layer 110 is formed as a single layer, there can be a shortcoming in that it is hard to achieve a high opening ratio.

With reference to FIGS. 13 to 15, a designing condition of the display panel 100 and the barrier layer for the operation of the narrow viewing angle mode will be explained.

FIG. 15 is a diagram illustrating the light traveling path in three layers having each different refractive index.

In FIG. 15, light moves from the first medium having the first refractive index $n_1$, through the second medium having the second refractive index $n_2$, to a third medium having a third refractive index $n_3$. $\theta_1$ is the incidence angle at which the light enters from the first medium to the second medium. $\theta_2$ is the refraction angle in the boundary between the first medium and the second medium, and also is the incidence angle at which the light enters from the second medium to the third medium. $\theta_3$ is the refraction angle in the boundary between the second medium and the third medium. d1 is a distance between the electrochromic element 113 and a pixel P. d2 is a distance between the electrochromic element 113 and the shielding portion 122.

The light traveling path of a case where the light meets mediums having different refractive indices adheres to Snell's law illustrated in FIG. 15, and a relational expression among the refractive index, the incidence angle and the refraction angle is equal to Equation 7.

$$n_1 \sin\theta_1 = n_2 \sin\theta_2 = n_3 \sin\theta_3 \qquad \text{[Equation 7]}$$

If the Equation 7 is arranged as a relational expression for x and y, it is equal to Equations 8 and 9.

$$x = d_1 \tan\left(\sin^{-1}\left(n_3 \sin\frac{\theta_3}{n_1}\right)\right) + d_2 \tan\left(\sin^{-1}\left(n_3 \sin\frac{\theta_3}{n_2}\right)\right) \qquad \text{[Equation 8]}$$

$$y = d_1 + d_2 \qquad \text{[Equation 9]}$$

By substituting the Equations 8 and 9 into the light path 1 of FIG. 14, the following relational Equation 10 can be obtained.

$$\frac{d_1 + d_2}{w - e} = \frac{y}{x} = \frac{d_1 + d_2}{d_1 \tan\left(\sin^{-1}\left(n_3 \sin\frac{\theta_3}{n_1}\right)\right) + d_2 \tan\left(\sin^{-1}\left(n_3 \sin\frac{\theta_3}{n_2}\right)\right)} \qquad \text{[Equation 10]}$$

In the narrow viewing angle mode, the light path 1 (path 1) emitted from the pixel should not be seen at an angle wider than the cut-off viewing angle (for example, 45 degrees), therefore, Equation 10 becomes the same condition as Equation 11.

$$\frac{d_1 + d_2}{w - e} \geq \frac{d_1 + d_2}{d_1 \tan\left(\sin^{-1}\left(n_3 \sin\frac{\theta_3}{n_1}\right)\right) + d_2 \tan\left(\sin^{-1}\left(n_3 \sin\frac{\theta_3}{n_2}\right)\right)} \qquad \text{[Equation 11]}$$

In relation to the light path 2 of FIG. 14, the light that exits into air should be totally reflected, or the light path not shielded by the first barrier layer 110 should be shielded by the second barrier layer 120. The value that satisfies the above is expressed as Equations 12 and 13.

$$\frac{d_1}{w - e} \leq \cot\left(\sin^{-1}\left(n_3 \sin\frac{\theta_3}{n_1}\right)\right) \qquad \text{[Equation 12]}$$

$$\frac{d_2}{a} \leq \cot\left(\sin^{-1}\left(n_1 \sin\frac{\theta_1}{n_3}\right)\right) \qquad \text{[Equation 13]}$$

In relation to the light path 3 of FIG. 14, the light that exits into air should be totally reflected, or the light path not shielded by the first barrier layer 110 should be shielded by the second barrier layer 120. The value that satisfies the above is expressed as Equations 14 and 15.

$$\frac{d_1}{g + e} \leq \cot\left(\sin^{-1}\left(n_3 \sin\frac{\theta_3}{n_1}\right)\right) \qquad \text{[Equation 14]}$$

$$\frac{d_2}{p - a} \leq \cot\left(\sin^{-1}\left(n_1 \sin\frac{\theta_1}{n_2}\right)\right) \qquad \text{[Equation 15]}$$

Here, $n_1$ is a refractive index value of the first planarization layer 105 of the display panel 100, and $n_{air}$ is a refractive index value of air and has a value of 1.

As a result, the display device of the fourth embodiment should meet the designing condition of Equations 11 to 15, in order for operation of the narrow viewing angle mode.

In addition, in order to minimize luminance loss of the display device of the fourth embodiment, it is preferable to design the display device on a condition of maximizing an opening ratio (OPR).

$$OPR = \frac{w - 2e}{w + g}$$

In the above, the embodiments of the present disclosure are described with reference to the accompanying drawings. It would be understood that the technical configuration of the present disclosure described hereinabove can be implemented in other concrete forms by those skilled in the art without departing from the technical concept or essential features thereof. Thus, it should be understood that embodiments described hereinabove are examples in all aspects, and do not limit the present disclosure. Further, the scope of the present disclosure will be denoted by the appended claims, rather than the detailed description. In addition, it should be construed that all modifications or variations that are derived from the meaning, scope and the concept of equivalence of the claims are covered in the scope of the present disclosure.

What is claimed is:

1. A display device comprising:
   a display panel including a plurality of pixels in a matrix form, wherein a first pixel and a second pixel are disposed adjacent to each other among the plurality of pixels, so as to form a group pixel;
   a barrier layer disposed on the display panel, and including an opening portion disposed in some area of the group pixel for transmitting light and an electrochromic element disposed in a remaining area of the group pixel; and
   a driver configured to selectively drive a wide viewing angle mode and a narrow viewing angle mode by controlling a signal applied to the display panel and the barrier layer, wherein the opening portion is overlapped with the first pixel and the electrochromic element is overlapped with the second pixel, wherein a width of the electrochromic element is greater than a width of the second pixel, and wherein the electrochromic element covers a gap between the first pixel and the second pixel.

2. The display device of claim 1, wherein, in the wide viewing angle mode, the driver applies an image signal constituting one frame to every pixel of the plurality of pixels forming the display panel, and the driver applies a control signal, to the barrier layer, for a transmitting mode that operates to make the electrochromic element transmit light.

3. The display device of claim 1, wherein, in the narrow viewing angle mode, the driver applies an image signal constituting one frame to the first pixel among the plurality of pixels, applies a black signal to the second pixel among the plurality of pixels, and applies a control signal, to the barrier layer, for a shielding mode that operates to make the electrochromic element shield light.

4. The display device of claim 1, wherein the opening portion of the barrier layer is disposed above the first pixel.

5. The display device of claim 1, wherein the electrochromic element comprises two transparent electrodes disposed opposite to each other, an electrochromic layer, and an ion storage layer.

6. The display device of claim 5, wherein the electrochromic layer is formed of a material of which optical properties are changed through oxidation or reduction reaction.

7. A display device comprising:
a display panel including a plurality of pixels in a matrix form;
a first barrier layer disposed on the display panel, and including a first opening portion disposed in some area of the plurality of pixels for transmitting light and an electrochromic element positioned in a remaining area of the plurality of pixels; and
a driver configured to selectively drive a wide viewing angle mode and a narrow viewing angle mode by controlling a signal applied to the display panel and the first barrier layer,
wherein the first opening portion is overlapped with a first pixel among the plurality of pixels and the electrochromic element is overlapped with a second pixel among the plurality of pixels,
wherein a width of the electrochromic element is greater than a width of the second pixel, and
wherein the electrochromic element covers a gap between the first pixel and the second pixel.

8. The display device of claim 7, wherein, in the wide viewing angle mode, the driver applies a control signal, to the first barrier layer, for a transmitting mode that operates to make the electrochromic element transmit light, and wherein, in the narrow viewing angle mode, the driver applies a control signal, to the first barrier layer, for a shielding mode that operates to make the electrochromic element shield light.

9. The display device of claim 7, wherein the display device further comprises a second barrier layer disposed on the first barrier layer, and wherein the second barrier layer comprises:
a second opening portion disposed at a position corresponding to the first opening portion, and
a shielding portion disposed at a position corresponding to the electrochromic element, and configured to shield light.

10. The display device of claim 7, wherein the display device further comprises a second barrier layer disposed between the first barrier layer and the display panel, and wherein the second barrier layer comprises a second opening portion disposed at a position corresponding to the first opening portion, and a shielding portion disposed at a position corresponding to the electrochromic element and configured to shield light.

11. A display device comprising:
a display panel including a plurality of pixels disposed in a matrix form;
a first barrier layer disposed on the display panel, and including a plurality of first opening portions configured to transmit light and a plurality of electrochromic elements disposed alternatively; and
a driver configured to selectively drive a wide viewing angle mode and a narrow viewing angle mode by controlling a signal applied to the display panel and the first barrier layer,
wherein each first opening portion of the plurality of first opening portions is disposed above a pixel corresponding to the first opening portion among the plurality of pixels, and overlaps with a partial area of the pixel,
wherein one electrochromic element of the plurality of electrochromic elements overlaps with another partial area of the pixel,
wherein the electrochromic element completely covers a gap between the adjacent pixels, and
wherein the electrochromic element overlaps the adjacent pixels.

12. The display device of claim 11, further comprising:
a second barrier layer including a plurality of second opening portions disposed at a position corresponding to the plurality of first opening portions, and a plurality of shielding portions disposed at a position corresponding to the plurality of electrochromic elements and configured to shield light,
wherein the second barrier layer is disposed on the first barrier layer or is disposed between the first barrier layer and the display panel.

* * * * *